(12) United States Patent
Jiang

(10) Patent No.: US 11,357,034 B2
(45) Date of Patent: Jun. 7, 2022

(54) TRIGGER HOLD METHOD AND TRIGGER HOLD APPARATUS

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/984,380

(22) Filed: Aug. 4, 2020

(65) Prior Publication Data

US 2020/0367274 A1    Nov. 19, 2020

Related U.S. Application Data

(63) Continuation of application No. PCT/CN2018/075997, filed on Feb. 9, 2018.

(51) Int. Cl.
*H04W 72/04* (2009.01)
*H04W 72/12* (2009.01)
(Continued)

(52) U.S. Cl.
CPC ......... *H04W 72/1284* (2013.01); *H04L 47/30* (2013.01); *H04W 28/0278* (2013.01); *H04W 28/10* (2013.01); *H04W 72/1268* (2013.01)

(58) Field of Classification Search
CPC ......... H04W 28/0278; H04W 72/1284; H04W 28/0273; H04W 28/10; H04W 72/12;
(Continued)

(56) References Cited

U.S. PATENT DOCUMENTS 9,167,594 B2    10/2015  Hsu
2012/0314672 A1*  12/2012  Chen ................ H04W 74/002
                                            370/329
(Continued)

FOREIGN PATENT DOCUMENTS

CN    102264098 A    11/2011
CN    102474886 A     5/2012
(Continued)

OTHER PUBLICATIONS

International Search Report in the international application No. PCT/CN2018/075997, dated Nov. 5, 2018.
(Continued)

*Primary Examiner* — Nathan S Taylor
(74) *Attorney, Agent, or Firm* — Syncoda LLC; Feng Ma

(57) ABSTRACT

A triggering retaining method includes: generating a media access control protocol data unit (MAC PDU) according to received UL grant; and in response to determining that the MAC PDU includes a buffer status report (BSR) or the MAC PDU includes all data to be transmitted but cannot include a BSR, retaining triggering of the BSR and/or a scheduling request (SR) within a first predetermined duration. According to embodiments of the disclosure, a service having lower requirements on a BSR transmission delay is ensured, and a MAC PDU containing a BSR can be generated at an uplink transmission opportunity corresponding to a UL grant for the service, so that the BSR is sent to a base station at the uplink transmission opportunity in time, the BSR transmission meets delay requirements of the service, and the good operation of the service is ensured.

20 Claims, 10 Drawing Sheets

(51) Int. Cl.
  *H04L 47/30* (2022.01)
  *H04W 28/02* (2009.01)
  *H04W 28/10* (2009.01)
(58) Field of Classification Search
  CPC ......... H04W 72/1268; H04W 72/1289; H04W 28/02; H04W 72/04; H04W 24/10; H04L 47/30; H04L 12/835
  See application file for complete search history.

(56) References Cited

U.S. PATENT DOCUMENTS

| | | | | |
|---|---|---|---|---|
| 2014/0064219 | A1* | 3/2014 | Quan | H04W 72/1284 370/329 |
| 2014/0348118 | A1* | 11/2014 | Zhang | H04W 28/0278 370/329 |
| 2015/0003371 | A1* | 1/2015 | Park | H04W 52/365 370/329 |
| 2016/0044707 | A1* | 2/2016 | Folke | H04W 72/1284 370/329 |
| 2016/0081108 | A1* | 3/2016 | Tseng | H04W 72/0493 370/329 |
| 2016/0128094 | A1* | 5/2016 | Lee | H04W 72/1284 370/329 |
| 2016/0157256 | A1 | 6/2016 | Tseng | |
| 2016/0198457 | A1* | 7/2016 | Chu | H04W 72/0413 370/329 |
| 2017/0006628 | A1* | 1/2017 | Takahashi | H04L 69/28 |
| 2017/0013638 | A1* | 1/2017 | Takahashi | H04W 72/1278 |
| 2017/0086168 | A1* | 3/2017 | Takahashi | H04W 28/0278 |
| 2018/0041410 | A1* | 2/2018 | Yi | H04L 43/065 |
| 2018/0092051 | A1* | 3/2018 | Dinan | H04W 52/365 |
| 2018/0176937 | A1* | 6/2018 | Chen | H04W 72/0413 |
| 2018/0279275 | A1* | 9/2018 | Chen | H04W 76/14 |
| 2019/0200260 | A1* | 6/2019 | Kim | H04W 72/0406 |

FOREIGN PATENT DOCUMENTS

| | | |
|---|---|---|
| CN | 102761967 A | 10/2012 |
| CN | 103814615 A | 5/2014 |
| CN | 106717052 A | 5/2017 |
| CN | 106856630 A | 6/2017 |
| CN | 107277856 A | 10/2017 |
| RU | 2504126 C1 | 1/2014 |
| RU | 2627296 C2 | 8/2017 |
| WO | 2014003327 A1 | 1/2014 |

OTHER PUBLICATIONS

English translation of the Written Opinion of the International Search Authority in the international application No. PCT/CN2018/075997, dated Nov. 5, 2018.
3rd Generation Partnership Project; Technical Specification Group Radio Access Network; NR; Medium Access Control (MAC) protocol specification(Release 15), 3GPP TS 38.321 V15.0.0 (Dec. 2017).
First Office Action of the Russian application No. 2020129190, dated Nov. 5, 2020.
Supplementary European Search Report in the European application No. 18905614.6, dated Nov. 26, 2020.
3GPP TSG-RAN WG2 Meeting #99bis, R2-1710974, vivo, "Discussion on the SR cancellation and failure handling", mailed on Oct. 8, 2017.
3GPP TSG-RAN WG2 Meeting #100, R2-1712827, vivo (email discussion rapporteur), "[99bis#39][NR UP/MAC]—BSR open issues", mailed on Nov. 17, 2017.
3GPP TSG-RAN2 NR AH-1801, R2-1801339, Xiaomi, "NR Unit Replacement in BSR procedure", mailed on Jan. 12, 2018.

* cited by examiner

In response to determining that the MAC PDU includes a BSR or that the MAC PDU includes all data to be transmitted other than a BSR, triggering of a BSR and/or a SR for a second service is retained within the first predetermined duration ⸺ S21

FIG. 3

TRIGGER HOLD METHOD AND TRIGGER HOLD APPARATUS

CROSS-REFERENCE TO RELATED APPLICATION

This application is a continuation of International Patent Application No. PCT/CN2018/075997 filed on Feb. 9, 2018, the disclosure of which is hereby incorporated by reference in its entirety.

BACKGROUND

After triggering a buffer status report (BSR), user equipment (UE) may determine whether the BSR can be transmitted to a base station. Generally, an uplink shared channel (ULSCH) resource is required to carry the BSR. If there is no available ULSCH resource, it is needed to send a scheduling request (SR) to the base station to request a ULSCH resource, thereby triggering the SR.

SUMMARY

The present disclosure relates generally to the technical field of communication, and more specifically to a triggering retaining method, a triggering retaining apparatus, an electronic device, and a computer-readable storage medium.

According to a first aspect of the embodiments of the disclosure, a triggering retaining method is provided, which is applied to user equipment. The method can include:

generating a media access control protocol data unit (MAC PDU) according to a received uplink (UL) grant; and retaining, in response to determining that the MAC PDU includes a BSR or in response to determining that the MAC PDU includes all data to be transmitted but does not include a BSR, triggering of the BSR and/or an SR within a first predetermined duration.

According to a second aspect of the embodiments of the disclosure, a triggering retaining apparatus is provided, which is applied to user equipment. The apparatus includes:

a generation portion, configured to generate a MAC PDU according to a received UL grant; and a retaining portion, configured to retain, in response to determining that the MAC PDU includes a BSR or in response to determining that the MAC PDU includes all data to be transmitted but does not include a BSR, triggering of the BSR and/or an SR within a first predetermined duration.

According to a third aspect of the embodiments of the disclosure, an electronic device is provided, which may include:

a processor; and memory configured to store instructions executable by the processor.

The processor may be configured to perform the triggering retaining method in any one of the above embodiments.

According to a fourth aspect of the embodiments of the disclosure, a computer-readable storage medium is provided. The computer-readable storage medium may have stored a computer program that, when executed by a processor, implement the triggering retaining method in any one of the above embodiments.

According to some embodiments of the disclosure, when it is determined that a MAC PDU includes a BSR or it is determined that the MAC PDU includes all data to be transmitted but does not include a BSR, it may be determined that cancellation of the BSR is not required, so that triggering of the BSR is retained within a first predetermined duration, and/or it may be determined that cancellation of an SR is required, so that triggering of the SR is retained within the first predetermined duration. Based on this, a service having lower requirements on a BSR transmission delay can be ensured, and a MAC PDU containing a BSR can be generated at an uplink transmission opportunity corresponding to a UL grant for the service, so that the BSR can be sent to a base station at the uplink transmission opportunity corresponding to the UL grant for the service in time, the BSR transmission can meet delay requirements of the service, and the good operation of the service is ensured.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

FIG. 3 is a schematic flowchart of retaining triggering of a BSR and/or triggering of an SR within a first predetermined duration according to some embodiments of the present disclosure.

DETAILED DESCRIPTION

Figure 1:
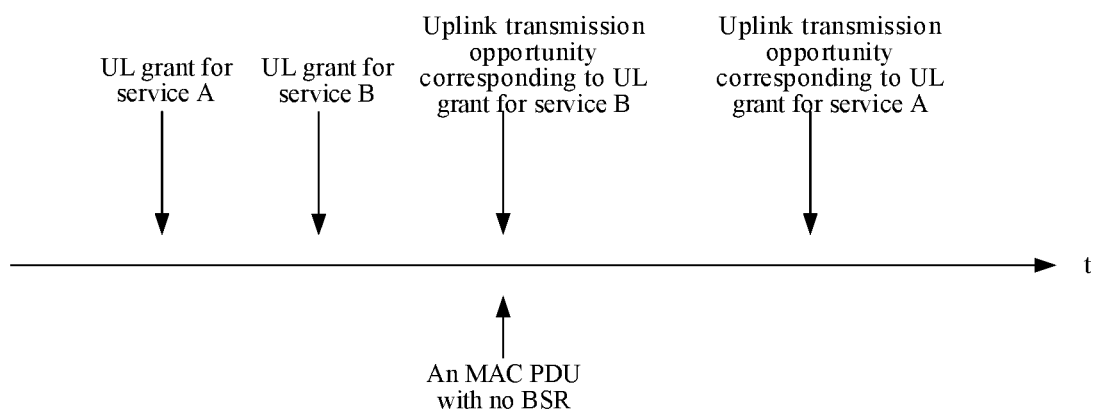
FIG. 1 is a schematic diagram of trigger cancellation.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure.

Rather, they are merely examples of the apparatus and method in accordance with certain aspects herein as recited in the accompanying claims.

In some cases, it may be needed to cancel triggering of a BSR or triggering of a SR. The cancellation of triggering of a BSR is taken as an example. For example, as shown in FIG. 1, when receiving uplink resource allocation indication information (UL grant) corresponding to service A, user equipment may generate a media access control protocol data unit (MAC PDU) according to the UL grant for the service A. When the MAC PDU includes a BSR, triggering of the BSR may be canceled. After the UL grant for the service A is received, if a UL grant for service B is received, then a MAC PDU may be generated according to the UL grant for the service B. Because triggering of the BSR has been canceled, the MAC PDU generated at this moment does not include the BSR.

In this case, even if an uplink transmission opportunity for the UL grant for the service B precedes an uplink transmission opportunity for the UL grant for the service A (for example, a delay allowed by the service B is lower than a delay allowed by the service A), a MAC PDU generated at the uplink transmission opportunity for the UL grant for the service B does not include the BSR, but a MAC PDU required to be generated at the uplink transmission opportunity for the UL grant for the service A includes the BSR, and the BSR is transmitted. Therefore, a large delay is caused in the transmission of the BSR, thereby adversely affecting the service B.

Figure 2:
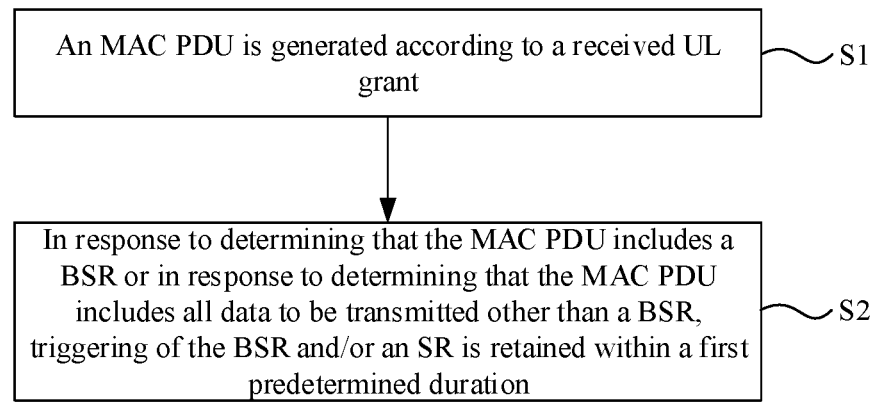
FIG. 2 is a schematic flowchart of a triggering retaining method according to some embodiments of the present disclosure.

FIG. 2 is a schematic flowchart of a triggering retaining method according to some embodiments of the present disclosure. The triggering retaining method shown in the embodiment may be applied to user equipment, such as a mobile phone or a tablet computer. The user equipment may communicate with a base station (such as a 5G base station) to receive a UL grant from the base station, and may send a BSR, an SR and the like to the base station.

As shown in FIG. 2, the triggering retaining method may include the following operations.

In operation S1, a MAC PDU is generated according to a received UL grant.

In an implementation, the base station may send a UL grant to the user equipment to indicate an uplink transmission opportunity for the user equipment, for example, a timing (such as a start timing an end timing and a duration) for a physical uplink shared channel (PUSCH).

In an implementation, the base station may send a UL grant to the user equipment through a PDCCH, or may also send a UL grant to the user equipment through a radio resource control (RRC) message.

In an implementation, after receiving a UL grant from the base station, the user equipment may generate a MAC PDU according to the received UL grant, and then may determine whether the generated MAC PDU includes a BSR or includes all data to be transmitted but does not include a BSR (for example, a remaining space of the MAC PDU is not enough to accommodate the BSR due to accommodation of all the data to be transmitted). The MAC PDU that cannot include a BSR may refer to a MAC control element (CE) that cannot include the BSR and a subheader of the MAC CE.

In operation S2, in response to determining that the MAC PDU includes a BSR or in response to determining that the MAC PDU includes all data to be transmitted other than a BSR, triggering of the BSR and/or an SR is retained within a first predetermined duration.

In an implementation, when the MAC PDU includes a BSR or the MAC PDU includes all data to be transmitted but cannot include a BSR, triggering of the BSR may be canceled. In this case, before operation S2, the BSR has been triggered.

In an implementation, when the MAC PDU includes a BSR and the BSR includes a buffer status of each BSR triggering event from a BSR trigger time to a time of the last BSR triggering event, or when the MAC PDU includes all data to be transmitted but cannot include a BSR, triggering of an SR may be canceled. In this case, before operation S2, the SR has been triggered.

If the BSR is canceled or the SR is canceled, problems may occur.

In an example, when receiving a UL grant for a first service, the user equipment may generate a MAC PDU according to the UL grant for the first service. When the MAC PDU includes a BSR, triggering of the BSR may be canceled. After the UL grant for the first service is received, when a UL grant for a second service is received, a MAC PDU may be generated according to the UL grant for the second service. Since triggering of the BSR has been canceled, the MAC PDU generated at this moment does not include the BSR.

In this case, if a delay allowed by the second service is less than a delay allowed by the first service, an uplink transmission opportunity corresponding to the UL grant for the second service may precede an uplink transmission opportunity corresponding to the UL grant for the first service. However, a MAC PDU generated at the uplink transmission opportunity corresponding to the UL grant for the second service may not include any BSR, only a MAC PDU generated at the uplink transmission opportunity corresponding to the UL grant for the first service can include a BSR, and the BSR may be transmitted. Therefore, a large delay may be caused in the transmission of the BSR, thereby adversely affecting the second service.

In an implementation, when it is determined that a MAC PDU includes a BSR or it is determined that the MAC PDU includes all data to be transmitted but cannot include a BSR, it may be determined that the BSR is not required to be cancelled, thereby still retaining triggering of the BSR within a first predetermined duration, and/or it may be determined that cancellation of an SR is required, thereby still retaining triggering of the SR within the first predetermined duration.

Based on this, a service (for example, the above second service) having lower requirements on a BSR transmission delay can be ensured, and a MAC PDU containing a BSR can be generated at an uplink transmission opportunity corresponding to a UL grant for the service, so that the BSR can be sent to a base station at the uplink transmission opportunity corresponding to the UL grant for the service in time, the BSR transmission can meet delay requirements of the service, and the good operation of the service is ensured.

FIG. 3 is a schematic flowchart of retaining triggering of a BSR and/or triggering of an SR within a first predetermined duration according to some embodiments of the present disclosure. As shown in FIG. 3, on the basis of the embodiment shown in FIG. 2, the UL grant is a UL grant for a first service, and the operation that triggering of the BSR and/or the SR is retained within the first predetermined duration may include the following operation.

In operation S21, triggering of a BSR and/or a SR for a second service is retained within the first predetermined duration.

In an implementation, after the UL grant for the first service is received, since the BSR and/or the SR for which triggering is retained corresponding to the first service cannot solve the technical problem in the background part, triggering of the BSR and/or the SR corresponding to the first service can be normally canceled when trigger cancellation conditions are satisfied, and triggering of the BSR and/or the SR for the second service but does not include the first service may be retained within the first predetermined duration. For example, triggering of a BSR and/or a SR corresponding to a logical channel for the second service may be retained.

Accordingly, the user equipment may receive a UL grant for the second service after receiving the UL grant for the first service. When a delay allowed by the second service is less than a delay allowed by the first service, that is, an uplink transmission opportunity corresponding to the UL grant for the second service precedes an uplink transmission opportunity corresponding to the UL grant for the first service, since triggering of a BSR is retained, a MAC PDU including the BSR may be generated at the uplink transmission opportunity corresponding to the UL grant for the second service, so that the BSR can be sent to the base station in time at the uplink transmission opportunity corresponding to the UL grant for the second service, the transmission of the BSR meets a delay requirement of the service, and the good operation of the second service is ensured.

Figure 4:
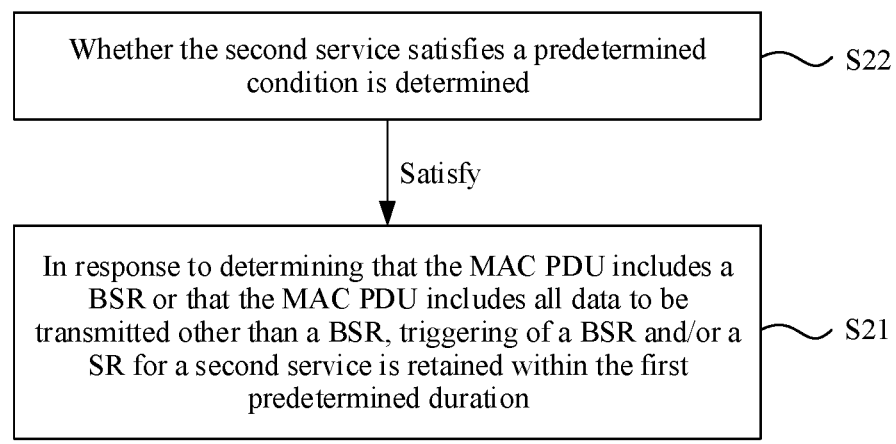
FIG. 4 is another schematic flowchart of retaining triggering of a BSR and/or triggering of an SR within a first predetermined duration according to some embodiments of the present disclosure.

FIG. 4 is another schematic flowchart of retaining triggering of a BSR and/or triggering of an SR within a first predetermined duration according to some embodiments of the present disclosure. As shown in FIG. 4, on the basis of the embodiment shown in FIG. 3, the operation that triggering of the BSR and/or the SR is retained within the first predetermined duration may further include the following operation.

In operation S22, before triggering of the BSR and/or the SR for the second service within the first predetermined duration is retained, it may be determined whether the second service satisfies a predetermined condition. When the second service satisfies the predetermined condition, operation S21 may be performed, and triggering of the BSR and/or the SR for the second service may be retained within the first predetermined duration.

The predetermined condition may be that a time parameter correlated (for example, positively correlated) to a required delay of the second service is less than a ULSCH duration corresponding to the UL grant for the first service or is less than a second predetermined duration corresponding to the UL grant for the first service or is prior to an uplink transmission timing corresponding to the UL grant for the first service. The second predetermined duration may be a duration between a timing at which the user equipment receives the UL grant for the first service and the uplink transmission timing corresponding to the UL grant for the first service.

In an implementation, not all services other than the first service needs triggering retaining of a BSR and/or a SR within the first predetermined duration. Triggering retaining of a BSR and/or a SR within the first predetermined duration is only needed for the second service requiring lower delay relative to the first service.

Therefore, it may be determined whether the second service satisfies a predetermined condition. The predetermined condition may be that the time parameter correlated to the required delay of the second service is less than a PUSCH duration corresponding to the UL grant for the first service or is less than a second predetermined duration (hereinafter referred to as K2) corresponding to the UL grant for the first service. K2 may be a duration between a timing at which the user equipment receives the UL grant for the first service and an uplink transmission timing (that is, a start time of an uplink transmission opportunity) corresponding to the UL grant for the first service.

The PUSCH duration corresponding to the UL grant for the first service and the second predetermined duration corresponding to the UL grant for the first service may represent the delay allowed by the first service. The time parameter may represent the size of the delay allowed by the second service. Therefore, when the time parameter is less than the PUSCH duration corresponding to the UL grant for the first service or is less than K2 corresponding to the UL grant for the first service, it may be determined that the delay allowed by the second service is less than the delay allowed by the first service, so that triggering of the BSR and/or the SR for the second service may be retained for the second service within the first predetermined duration.

In some embodiments, the time parameter may be a maximum ULSCH duration in a priority limit parameter of a logical channel for the second service, and the predetermined condition may be that the time parameter is less than the ULSCH duration corresponding to the UL grant for the first service.

In an implementation, a maximum PUSCH duration in a logical channel priority (LCP) limit parameter corresponding to the second service may act as a time parameter to represent the size of the delay allowed by the second service. In this case, the predetermined condition may be that the time parameter is less than the PUSCH duration corresponding to the UL grant for the first service.

In some embodiments, when the priority limit parameter includes no maximum ULSCH duration, a maximum ULSCH duration allowed by the user equipment is taken as the maximum ULSCH duration in the priority limit parameter.

In an implementation, since the LCP limit parameter does not necessarily include the maximum PUSCH duration, the maximum PUSCH duration allowed by the user equipment may be taken as the maximum PUSCH duration in the LCP limit parameter, so as to ensure that whether the second service satisfies the predetermined condition can be accurately determined.

In some embodiments, the time parameter may be a transmission cycle of an SR configured for a logical channel for the second service, and the predetermined condition may be that the time parameter is less than the second predetermined duration corresponding to the UL grant for the first service.

In an implementation, a transmission cycle of an SR of a logical channel for the second service may act as a time parameter to represent the size of the delay allowed by the second service. In this case, the predetermined condition may be that the time parameter is less than K2 corresponding to the UL grant for the first service.

In some embodiments, the time parameter may be a third predetermined duration, and the predetermined condition may be that the time parameter is less than the second predetermined duration corresponding to the UL grant for the first service. The third predetermined duration may be configured by the base station for the user equipment in advance, or, the SR may be triggered in response to there is no ULSCH available for BSR transmission within the third predetermined duration starting from a timing at which the BSR corresponding to the first service is triggered.

In an implementation, the size of the delay allowed by the second service may be represented by a third predetermined duration as a time parameter. In this case, the predetermined condition may be that the time parameter is less than K2 corresponding to the UL grant for the first service.

The third predetermined duration may be configured by the base station for the user equipment in advance and dedicated for representing the size of the delay allowed by the second service. Or, the third predetermined duration may act as one of conditions for determining whether to trigger the SR, that is, the user equipment may trigger the SR in response to that there is no PUSCH available for transmitting the BSR (that is, there is no available uplink transmission opportunity) within a third duration range starting from a trigger time of the BSR corresponding to the first service.

In some embodiments, the time parameter may be a maximum second predetermined duration configured for a logical channel for the second service, and the predetermined condition may be that the time parameter is less than the second predetermined duration corresponding to the UL grant for the first service.

In an implementation, maximum K2 configured for a logical channel for the second service may act as a time parameter to represent the size of the delay allowed by the second service. In this case, the predetermined condition may be that the time parameter is less than K2 corresponding to the UL grant for the first service.

If the logical channel for the second service is not configured with the transmission cycle of the SR, and/or the second service is not configured with the third predetermined duration, and/or the logical channel for the second service is not configured with the maximum K2, it may be determined that the second service does not satisfy the predetermined condition.

In some embodiments, the time parameter may be an uplink transmission timing latest configured for a SR for a logical channel for triggering of a BSR after a logical channel for the second service triggers the BSR, and the predetermined condition may be that the time parameter is prior to the uplink transmission timing corresponding to the UL grant for the first service.

In an implementation, the size of the delay allowed by the second service may be represented by an uplink transmission timing latest configured for a SR for a logical channel for triggering of a BSR (such as a starting time of a PUCCH available for transmitting a SR) after a logical channel for the second service triggers the BSR. In this case, the predetermined condition may be that a time parameter is prior to the uplink transmission timing corresponding to the UL grant for the first service (such as a starting time of a PUSCH available for transmitting a BSR).

In some embodiments, the first predetermined duration may be from a timing at which it is determined that the MAC PDU includes a BSR or it is determined that the MAC PDU does not include any BSR but includes all data to be transmitted to the uplink transmission timing corresponding to the UL grant for the first service.

In an implementation, when the MAC PDU includes a BSR or the MAC PDU includes all data to be transmitted but cannot include a BSR, triggering of the BSR and/or the SR may be canceled. Since the MAC PDU generated at the uplink transmission timing corresponding to the UL grant for the first service may include the BSR, it is not necessary to retain triggering of the BSR and/or the SR to the uplink transmission timing corresponding to the UL grant for the first service, but triggering of the BSR and/or the SR may be retained within a period of time from determination of trigger cancellation of the BSR and/or the SR to the uplink transmission timing corresponding to the UL grant for the first service.

In some embodiments, the first predetermined duration may be from a timing at which it is determined that the MAC PDU includes a BSR or it is determined that the MAC PDU does not include any BSR but includes all data to be transmitted to a target time preceding the uplink transmission timing corresponding to the UL grant for the first service by a fourth predetermined duration.

The fourth predetermined duration may be from an end timing of a PDCCH for the user equipment to receive the UL grant for the first service to a first uplink transmission timing supportable by the user equipment after the end timing.

In an implementation, the fourth predetermined duration (referred to as N2) may be from an end timing of a PDCCH for the user equipment to receive the UL grant for the first service to a first uplink transmission timing supportable by the user equipment after the end timing. That is, N2 may be a duration required for the user equipment to handle a transaction (for example, a duration from the end timing to a timing at which the MAC PDU including the BSR is generated), and N2 may be set at a base station side. For example, different N2 may be set for different subcarrier spacing (SCS).

N2 is at least required for the user equipment to handle the transaction, therefore, if the BSR of the logical channel for the second service is triggered at a certain time between N2 before the uplink transmission timing and the uplink transmission timing, the user equipment may start to generate a MAC PDU including the BSR for the UL grant for the second service, and then the MAC PDU including the BSR can be generated after the uplink transmission timing. Since the user equipment has been able to generate the MAC PDU including the BSR for the UL grant for the first service at the uplink transmission timing, it is not necessary to generate the MAC PDU including the BSR for the second service.

It can be seen that the retain of the BSR and/or the SR at a certain time between N2 before the uplink transmission timing and the uplink transmission timing cannot solve the technical problem in the background, so that the duration of retaining triggering of the BSR and/or the SR may only last until N2 before the uplink transmission timing.

Figure 5:
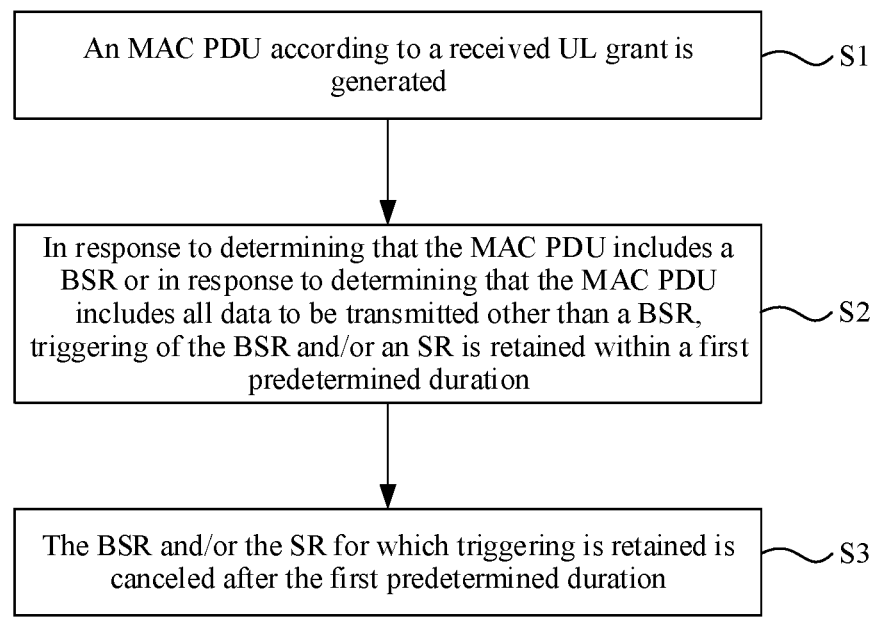
FIG. 5 is a schematic flowchart of another triggering retaining method according to some embodiments of the present disclosure.

FIG. 5 is a schematic flowchart of another triggering retaining method according to some embodiments of the present disclosure. As shown in FIG. 5, on the basis of the embodiment shown in FIG. 2, the triggering retaining method may further include the following operation.

In operation S3, the BSR and/or the SR for which triggering is retained is canceled after the first predetermined duration.

In an implementation, since the user equipment generates the MAC PDU including the BSR at the uplink transmission timing corresponding to the UL grant for the first service when the BSR and/or the SR for which triggering is retained reaches the first predetermined duration, it is not necessary to continue retaining triggering of the BSR and/or the SR subsequently, so that the BSR and/or the SR for which triggering is retained can be canceled to avoid confusion in the subsequent triggering of the BSR and/or the SR.

Corresponding to the above embodiments of the triggering retaining method, the disclosure also provides embodiments of a triggering retaining apparatus.

Figure 6:
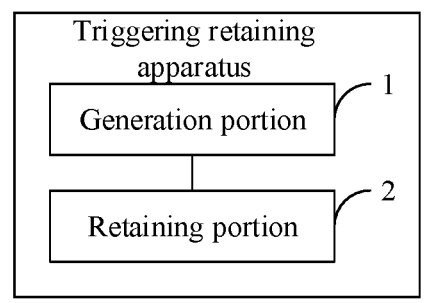
FIG. 6 is a schematic block diagram of a triggering retaining apparatus according to some embodiments of the present disclosure.

FIG. 6 is a schematic block diagram of a triggering retaining apparatus according to some embodiments of the present disclosure. The triggering retaining apparatus shown in the present embodiment may be applied to user equipment, such as a mobile phone or a tablet computer. The user equipment may communicate with a base station (such as a 5G base station) to receive a UL grant from the base station, and may send a BSR, an SR and the like to the base station.

As shown in FIG. 6, the triggering retaining apparatus may include:

a generation portion 1, configured to generate a MAC PDU according to a received UL grant; and a retaining portion 2, configured to retain, in response to determining that the MAC PDU includes a BSR or in response to determining that the MAC PDU includes all data to be transmitted but does not include a BSR, triggering of the BSR and/or an SR within a first predetermined duration.

Figure 7:
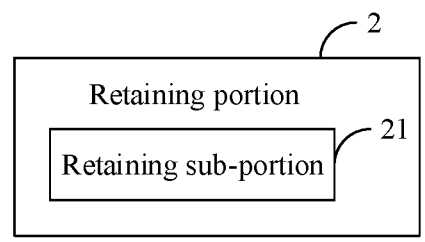
FIG. 7 is a schematic block diagram of a retaining portion according to some embodiments of the present disclosure.

FIG. 7 is a schematic block diagram of a retaining portion according to some embodiments of the present disclosure. As shown in FIG. 7, on the basis of the embodiment shown in FIG. 6, the UL grant is a UL grant for a first service, and the retaining portion 2 can include:

a retaining sub-portion 21, configured to retain triggering of a BSR and/or a SR for a second service within the first predetermined duration.

Figure 8:
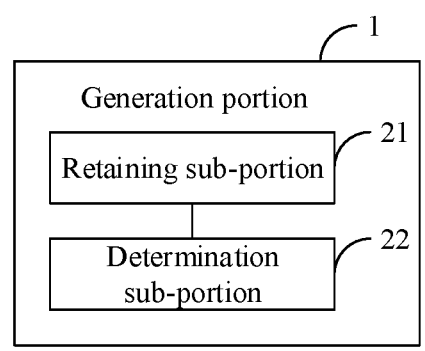
FIG. 8 is a schematic block diagram of another retaining portion according to some embodiments of the present disclosure.

FIG. 8 is a schematic block diagram of another retaining portion according to some embodiments of the present disclosure. As shown in FIG. 8, on the basis of the embodiment shown in FIG. 7, the retaining portion 2 may further include:

a determination sub-portion 22, configured to determine, before retaining triggering of the BSR and/or the SR for the second service within the first predetermined duration, whether the second service satisfies a predetermined condition.

In response to the second service satisfies the predetermined condition, the retaining sub-portion 21 is configured to retain triggering of the BSR and/or the SR for the second service within the first predetermined duration.

The predetermined condition may be that a time parameter correlated to a required delay of the second service is less than a ULSCH duration corresponding to the UL grant for the first service or is less than a second predetermined duration corresponding to the UL grant for the first service or is prior to an uplink transmission timing corresponding to the UL grant for the first service. The second predetermined duration may be a duration between a timing at which the user equipment receives the UL grant for the first service and the uplink transmission timing corresponding to the UL grant for the first service.

In some embodiments, the time parameter may be a maximum ULSCH duration in a priority limit parameter of a logical channel for the second service, and the predetermined condition is that the time parameter is less than the ULSCH duration corresponding to the UL grant for the first service.

In some embodiments, when the priority limit parameter includes no maximum ULSCH duration, a maximum ULSCH duration allowed by the user equipment is taken as the maximum ULSCH duration in the priority limit parameter.

In some embodiments, the time parameter may be a transmission cycle of an SR configured for a logical channel for the second service, and the predetermined condition is that the time parameter is less than the second predetermined duration corresponding to the UL grant for the first service.

In some embodiments, the time parameter may be a third predetermined duration, and the predetermined condition may be that the time parameter is less than the second predetermined duration corresponding to the UL grant for the first service. The third predetermined duration may be configured by the base station for the user equipment in advance, or, the SR may be triggered in response to there is no ULSCH available for BSR transmission within the third predetermined duration starting from a timing at which the BSR corresponding to the first service is triggered.

In some embodiments, the time parameter may be a maximum second predetermined duration configured for a logical channel for the second service, and the predetermined condition is that the time parameter is less than the second predetermined duration corresponding to the UL grant for the first service.

In some embodiments, the time parameter may be an uplink transmission timing latest configured for a SR for a logical channel for triggering of a BSR after a logical channel for the second service triggers the BSR, and the predetermined condition may be that the time parameter is prior to the uplink transmission timing corresponding to the UL grant for the first service.

In some embodiments, the first predetermined duration may be from a timing at which it is determined that the MAC PDU includes a BSR or it is determined that the MAC PDU does not include any BSR but includes all data to be transmitted to the uplink transmission timing corresponding to the UL grant for the first service.

In some embodiments, the first predetermined duration may be from a timing at which it is determined that the MAC PDU includes a BSR or it is determined that the MAC PDU does not include any BSR but includes all data to be transmitted to a target time preceding the uplink transmission timing corresponding to the UL grant for the first service by a fourth predetermined duration.

The fourth predetermined duration may be from an end timing of a PDCCH for the user equipment to receive the UL grant for the first service to a first uplink transmission timing supportable by the user equipment after the end timing.

Figure 9:
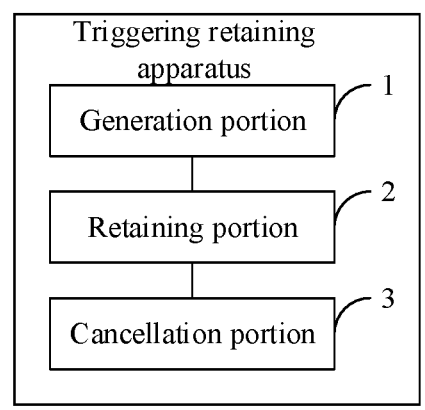
FIG. 9 is a schematic block diagram of another triggering retaining apparatus according to some embodiments of the present disclosure.

FIG. 9 is a schematic block diagram of another triggering retaining apparatus according to some embodiments of the present disclosure. As shown in FIG. 9, on the basis of the embodiment shown in FIG. 6, the triggering retaining apparatus may further include:

a cancellation portion 3, configured to cancel the BSR and/or the SR for which triggering is retained after the first predetermined duration.

With respect to the triggering retaining apparatus in the above embodiments, the specific manners for performing operations for individual portions therein have been described in detail in the embodiment regarding the method, which will not be elaborated herein.

For the apparatus embodiments, reference will now be made in part to the description of the method embodiments. The apparatus embodiments described above are only schematic. The units described as separate components may or may not be physically separated, and the components displayed as units may or may not be physical units, i.e., may be located in one place or may be distributed over multiple network units. Some or all of the portions can be selected according to actual needs to achieve the purpose of the scheme of the embodiments. Those ordinarily skilled in the art would understand and practice without involving any inventive effort.

An embodiment of the disclosure also provides an electronic device, which includes:

a processor; and memory configured to store instructions executable by the processor.

The processor is configured to perform the triggering retaining method in any one of the above embodiments.

An embodiment of the disclosure further provides a non-transitory computer-readable storage medium. The computer-readable storage medium has thereon stored a computer program that, when executed by a processor, cam implement the triggering retaining method in any one of the above embodiments.

Figure 10:
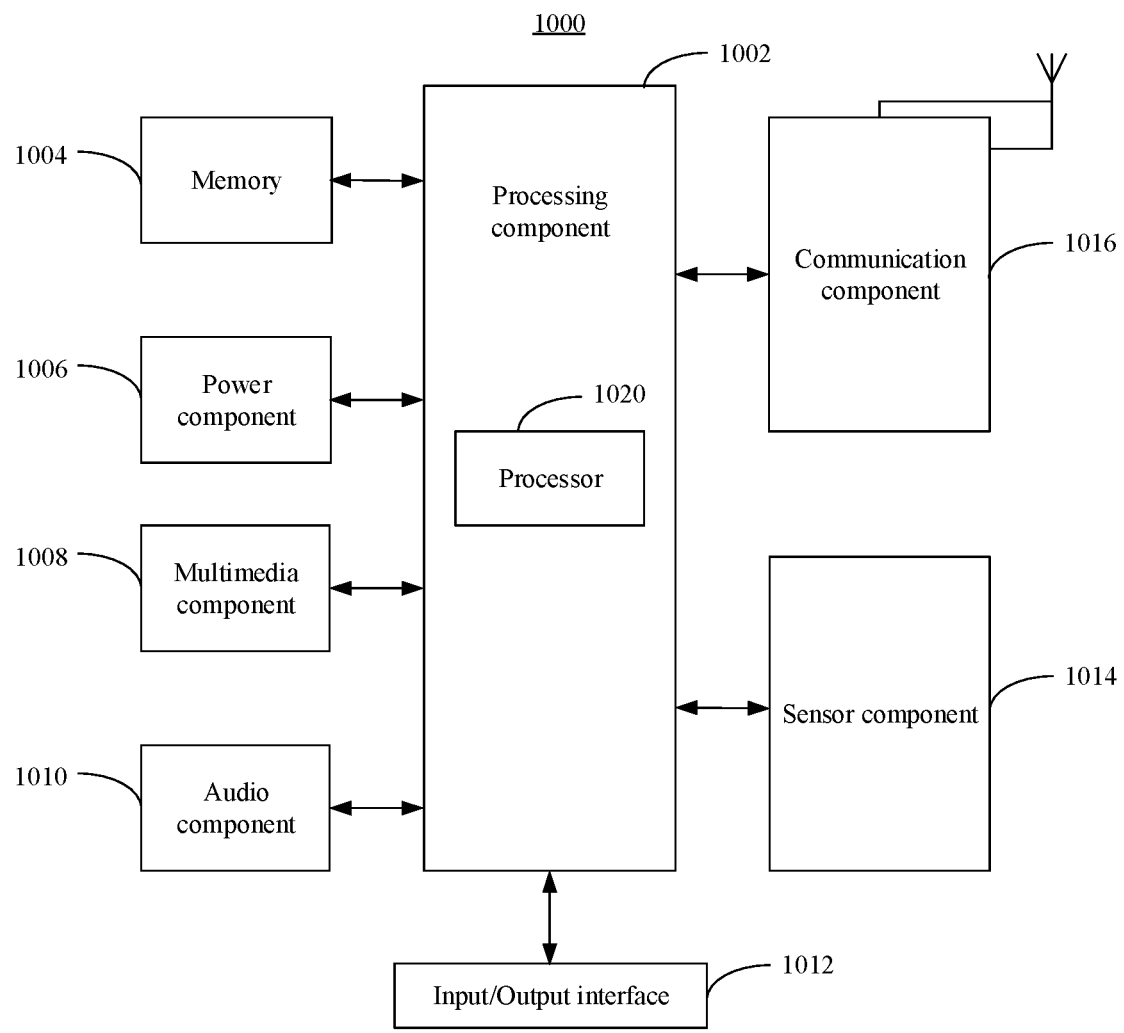
FIG. 10 is a schematic block diagram of a device for triggering retaining according to some embodiments of the present disclosure.

FIG. 10 is a schematic block diagram of a device 1000 for triggering retaining according to some embodiments of the present disclosure. For example, the device 1000 may be a mobile phone, a computer, a digital broadcasting terminal, a message transceiver device, a game console, a tablet device, a medical device, a fitness device, a personal digital assistant, and the like.

Referring to FIG. 10, the device 1000 may include one or more following components: a processing component 1002, a memory 1004, a power component 1006, a multimedia component 1008, an audio component 1010, an Input/Output (I/O) interface 1012, a sensor component 1014, and a communication component 1016.

The processing component 1002 is generally configured to control overall operations of the device 1000, such as operations related to displaying, telephone calls, data communications, camera operations, and recording operations. The processing component 1002 may include one or more processors 1020 to execute instructions to complete all or part of the operations of the method described above. In addition, the processing component 1002 may include one or more portions to facilitate the interaction between the processing component 1002 and other components. For example, the processing component 1002 may include a multimedia portion to facilitate the interaction between the multimedia component 1008 and the processing component 1002.

The memory 1004 is configured to store various types of data to support the operations at the device 1000. Examples of such data include instructions for any application program or method operated on the device 1000, contact data, phone book data, messages, pictures, videos, and the like. The memory 1004 may be implemented by any type of volatile or non-volatile storage devices or a combination thereof, such as Static Random Access Memory (SRAM), an Electrically Erasable Programmable Read-Only Memory (EEPROM), a Programming Read-Only Memory (EPROM), a Programmable Read-Only Memory (PROM), a Read-Only Memory (ROM), a magnetic memory, a flash memory, a magnetic disk or an optical disk.

The power component 1006 is configured to provide power for various components of the device 1000. The power component 1006 may include a power management system, one or more power supplies, and other components associated with generating, managing, and distributing power for the device 1000.

The multimedia component 1008 may include a screen that provides an output interface between the device 1000 and a user. In some embodiments, the screen may include a Liquid Crystal Display (LCD) and a Touch Panel (TP). In some embodiments, an organic light-emitting diode (OLED) display or other types of displays can be employed.

If it includes the TP, the screen may be implemented as a touch screen to receive an input signal from a user. The TP includes one or more touch sensors to sense touch, swipe, and gestures on the TP. The touch sensor may not only sense a boundary of a touch or swipe action, but also detect duration and pressure related to the touch or swipe operation. In some embodiments, the multimedia component 1008 includes a front camera and/or a rear camera. When the device 1000 is in an operation mode, such as a photographing mode or a video mode, the front camera and/or the rear camera may receive external multimedia data. Each front camera and each rear camera may be fixed optical lens systems or may have focal lengths and optical zoom capabilities.

The audio component 1010 is configured to output and/or input audio signals. For example, the audio component 1010 includes a microphone (MIC), and the microphone is configured to receive an external audio signal when the device 1000 is in an operation mode, such as a calling mode, a recording mode, and a voice identification mode. The received audio signals may be further stored in the memory 1004 or transmitted via the communication component 1016. In some embodiments, the audio component 1010 may further include a speaker to output audio signals.

The I/O interface 1012 is configured to provide an interface between the processing component 1002 and a peripheral interface module. The peripheral interface module may be a keyboard, a click wheel, a button, and the like. These buttons may include, but not limited to: a home button, a volume button, a start button, and a lock button.

The sensor component 1014 may include one or more sensors configured to provide various aspects of state assessment for the device 1000. For example, the sensor component 1014 may detect an on/off state of the device 1000 and a relative position of components. For example, the components are a display and a small keypad of the device 1000. The sensor component 1014 may further detect a position change of the device 1000 or one component of the device 1000, the presence or absence of user contact with the device 1000, orientation or acceleration/deceleration of the device 1000, and temperature variations of the device 1000. The sensor component 1014 may include a proximity sensor configured to detect the presence of objects nearby without any physical contact. The sensor component 1014 may also include light sensors, such as CMOS or CCD image sensors, for use in imaging applications. In some embodiments, the sensor component 1014 may also include an acceleration sensor, a gyroscope sensor, a magnetic sensor, a pressure sensor, or a temperature sensor.

The communication component 1016 is configured to facilitate wired or wireless communications between the device 1000 and other devices. The device 1000 may access a wireless network based on a communication standard, such as Wi-Fi, 2G or 3G, or a combination thereof. In one exemplary embodiment, the communication component 1016 receives broadcast signals or broadcast related information from an external broadcast management system via a broadcast channel. In one exemplary embodiment, the communication component 1016 further includes an NFC module to facilitate short-range communications. For example, the NFC module may be implemented based on a Radio Frequency Identification (RFID) technology, an Infrared Data Association (IrDA), an Ultra-Wide Band (UWB) technology, a Bluetooth (BT) technology and other technologies.

In some embodiments, the device 1000 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic elements, for performing the triggering retaining method according to any one of the above embodiments.

In some embodiments, a non-transitory computer-readable storage medium including instructions, such as a memory 1004 including instructions, is further provided.

The instructions may be executed by a processor 1020 of a device 1000 to complete the above methods. For example, the non-transitory computer-readable storage medium may be an ROM, a RAM, a CD-ROM, a magnetic tape, a floppy disk, an optical data storage device, and the like.

The terms "first" and "second" are used for descriptive purposes only and are not to be construed as indicating or implying a relative importance or implicitly indicating the number of technical features indicated. Thus, elements referred to as "first" and "second" can include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

It is to be understood that "multiple" mentioned in the present disclosure refers to two or more than two. "And/or" describes an association relationship of associated objects and represent that three relationships can exist. For example, A and/or B can represent three conditions, i.e., independent existence of A, coexistence of A and B and independent existence of B. Character "/" usually represents that previous and next associated objects form an "or" relationship.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A triggering retaining method, implemented by user equipment, the trigger retaining method comprising:
   generating a media access control protocol data unit (MAC PDU) according to received uplink (UL) resource allocation indication information; and
   in response to determining that the MAC PDU comprises a buffer status report (BSR), cancelling the BSR and/or a scheduling request (SR), for which triggering is retained, after a first predetermined duration,
   wherein the first predetermined duration is from a timing, at which it is determined that the MAC PDU comprises the BSR to the timing at which the MAC PDU is transmitted according to the uplink resource allocation indication information for a first service.

2. The triggering retaining method according to claim 1, further comprising:
   retaining the triggering of at least one of the BSR or the SR within the first predetermined duration by retaining triggering of at least one of a BSR or a SR for a second service within the first predetermined duration.

3. The triggering retaining method according to claim 2, wherein the retaining the triggering of at least one of the BSR or the SR within the first predetermined duration further comprises:
   determining, before retaining triggering of at least one of the BSR or the SR for the second service within the first predetermined duration, whether the second service satisfies a predetermined condition,
in response to the second service satisfies the predetermined condition, retaining the triggering of at least one of the BSR or the SR for the second service within the first predetermined duration;
wherein the predetermined condition is that a time parameter correlated to a required delay of the second service is less than an uplink shared channel (ULSCH) duration corresponding to the uplink resource allocation indication information for the first service or is less than a second predetermined duration corresponding to the uplink resource allocation indication information for the first service or is prior to an uplink transmission timing corresponding to the uplink resource allocation indication information for the first service, the second predetermined duration being a duration between a timing at which the user equipment receives the uplink resource allocation indication information for the first service and the uplink transmission timing corresponding to the uplink resource allocation indication information for the first service.

4. The triggering retaining method according to claim 3, wherein the time parameter is a maximum ULSCH duration in a priority limit parameter of a logical channel for the second service, and the predetermined condition is that the time parameter is less than the ULSCH duration corresponding to the uplink resource allocation indication information for the first service.

5. The triggering retaining method according to claim 4, wherein in response to that the priority limit parameter comprises no maximum ULSCH duration, a maximum ULSCH duration allowed by the user equipment is taken as the maximum ULSCH duration in the priority limit parameter.

6. The triggering retaining method according to claim 3, wherein the time parameter is a transmission cycle of an SR configured for a logical channel for the second service, and the predetermined condition is that the time parameter is less than the second predetermined duration corresponding to the uplink resource allocation indication information for the first service.

7. The triggering retaining method according to claim 3, wherein the time parameter is a third predetermined duration, and the predetermined condition is that the time parameter is less than the second predetermined duration corresponding to the uplink resource allocation indication information for the first service, wherein the third predetermined duration is configured by a base station for the user equipment in advance, or, the SR is triggered in response to there is no ULSCH available for BSR transmission within the third predetermined duration starting from a timing at which the BSR corresponding to the first service is triggered.

8. The triggering retaining method according to claim 3, wherein the time parameter is a maximum second predetermined duration configured for a logical channel for the second service, and the predetermined condition is that the time parameter is less than the second predetermined duration corresponding to the uplink resource allocation indication information for the first service.

9. The triggering retaining method according to claim 3, wherein the time parameter is an uplink transmission timing latest configured for a SR for a logical channel for triggering of a BSR after a logical channel for the second service triggers the BSR, and the predetermined condition is that the time parameter is prior to the uplink transmission timing corresponding to the uplink resource allocation indication information for the first service.

10. A communication system implementing the method of claim 1, comprising a mobile terminal, wherein upon it is determined that the MAC PDU includes the BSR or it is determined that the MAC PDU includes all data to be transmitted but does not include a BSR, the mobile terminal is configured to determine at least one of:
that cancellation of the BSR is not required, so that triggering of the BSR is retained within the first predetermined duration; and
that cancellation of the SR is required, so that triggering of the SR is retained within the first predetermined duration.

11. The communication system according to claim 10, wherein the mobile terminal is configured to ensure a service having lower requirements on a BSR transmission delay, and generate the MAC PDU containing the BSR at a uplink transmission opportunity corresponding to a UL grant for the service, such that the BSR is sent to a base station at the uplink transmission opportunity corresponding to the UL grant for the service in time, thereby having the BSR transmission meet delay requirements of the service.

12. The communication system according to claim 11, further comprising the base station configured to provide the UL grant to the mobile terminal, and predetermine a time parameter for the mobile terminal.

13. A triggering retaining apparatus, implemented by user equipment, the triggering retaining apparatus comprising:
a processor; and
memory configured to store instructions executable by the processor,
wherein the processor is configured to:
generate a media access control protocol data unit (MAC PDU) according to received uplink resource allocation indication information; and
in response to determining that the MAC PDU comprises a buffer status report (BSR), cancel the BSR and/or a scheduling request (SR), for which triggering is retained, after a first predetermined duration,
wherein the first predetermined duration is from a timing, at which it is determined that the MAC PDU comprises the BSR to the timing at which the MAC PDU is transmitted according to the uplink resource allocation indication information for a first service.

14. The triggering retaining apparatus according to claim 13, wherein the processor is further configured to:
retain triggering of at least one of a BSR or a SR for a second service within the first predetermined duration.

15. The triggering retaining apparatus according to claim 14, wherein the processor is further configured to:
determine, prior to the retaining triggering of at least one of the BSR or the SR for the second service within the first predetermined duration, whether the second service satisfies a predetermined condition,
wherein in response to the second service satisfies the predetermined condition, the retaining sub-portion is configured to retain triggering of at least one of the BSR or the SR for the second service within the first predetermined duration; and
the predetermined condition is that a time parameter correlated to a required delay of the second service is less than an uplink shared channel (ULSCH) duration corresponding to the uplink resource allocation indication information for the first service or is less than a second predetermined duration corresponding to the uplink resource allocation indication information for the first service or is prior to an uplink transmission timing corresponding to the uplink resource allocation indication information for the first service, and the second predetermined duration is a duration between a timing at which the user equipment receives the uplink resource allocation indication information for the first service and the uplink transmission timing corresponding to the uplink resource allocation indication information for the first service.

16. The triggering retaining apparatus according to claim 15, wherein the time parameter is a maximum ULSCH duration in a priority limit parameter of a logical channel for the second service, and the predetermined condition is that the time parameter is less than the ULSCH duration corresponding to the uplink resource allocation indication information for the first service.

17. The triggering retaining apparatus according to claim 15, wherein the time parameter is a transmission cycle of an SR configured for a logical channel for the second service, and the predetermined condition is that the time parameter is less than the second predetermined duration corresponding to the uplink resource allocation indication information for the first service.

18. The triggering retaining apparatus according to claim 15, wherein the time parameter is a third predetermined duration, and the predetermined condition is that the time parameter is less than the second predetermined duration corresponding to a UL grant for the first service, wherein the third predetermined duration is configured by a base station for the user equipment in advance, or, the SR is triggered in response to there is no ULSCH available for BSR transmission within the third predetermined duration starting from a time at which the BSR corresponding to the first service is triggered.

19. The triggering retaining apparatus according to claim 15, wherein the time parameter is a maximum second predetermined duration configured for a logical channel of the second service, and the predetermined condition is that the time parameter is less than the second predetermined duration corresponding to a UL grant for the first service.

20. The triggering retaining apparatus according to claim 15, wherein the time parameter is an uplink transmission time latest configured for a SR for a logical channel for trigger of a BSR after a logical channel of the second service triggers the BSR, and the predetermined condition is that the time parameter is prior to the uplink transmission time corresponding to a UL grant for the first service.

\* \* \* \* \*